Figure 1:
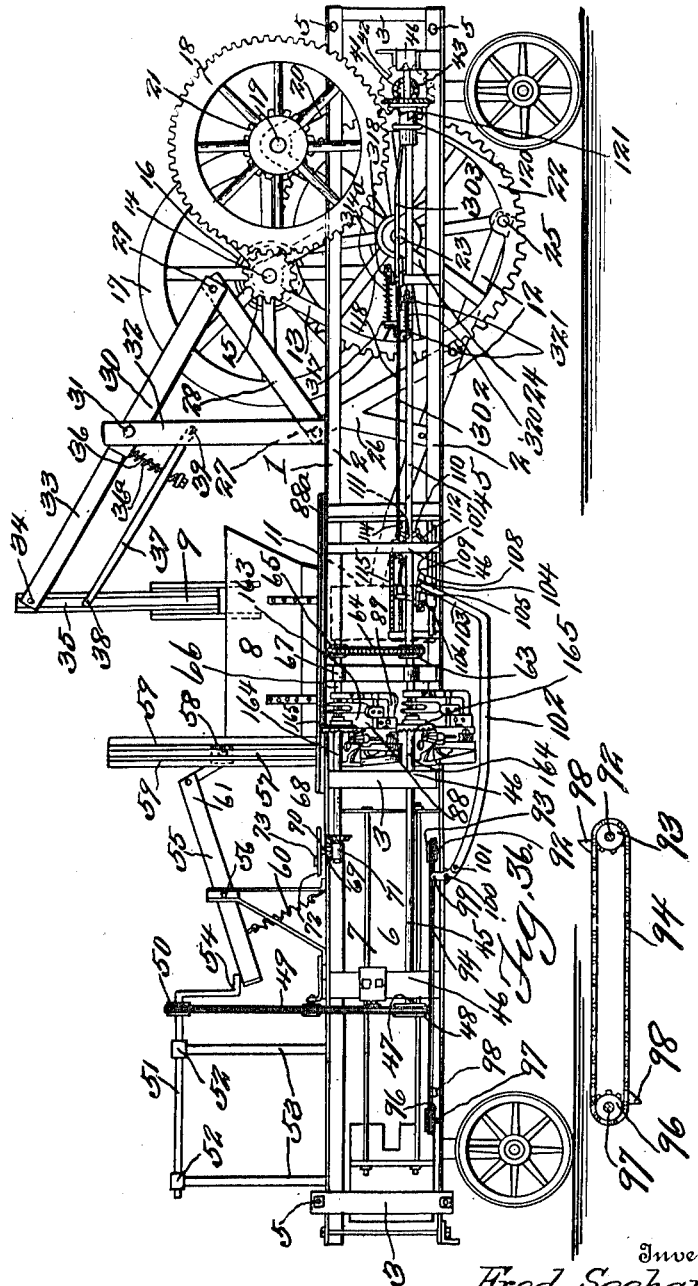

F. SEEHAFER & W. PRAHL.
HAY PRESS.
APPLICATION FILED JAN. 19, 1912.

1,040,786.

Patented Oct. 8, 1912.
11 SHEETS—SHEET 1.

Witnesses
Francis L. Boswell.
C. E. Frothingham.

Inventors
Fred Seehafer
and William Prahl,

By D. Swift & Co.
Attorneys

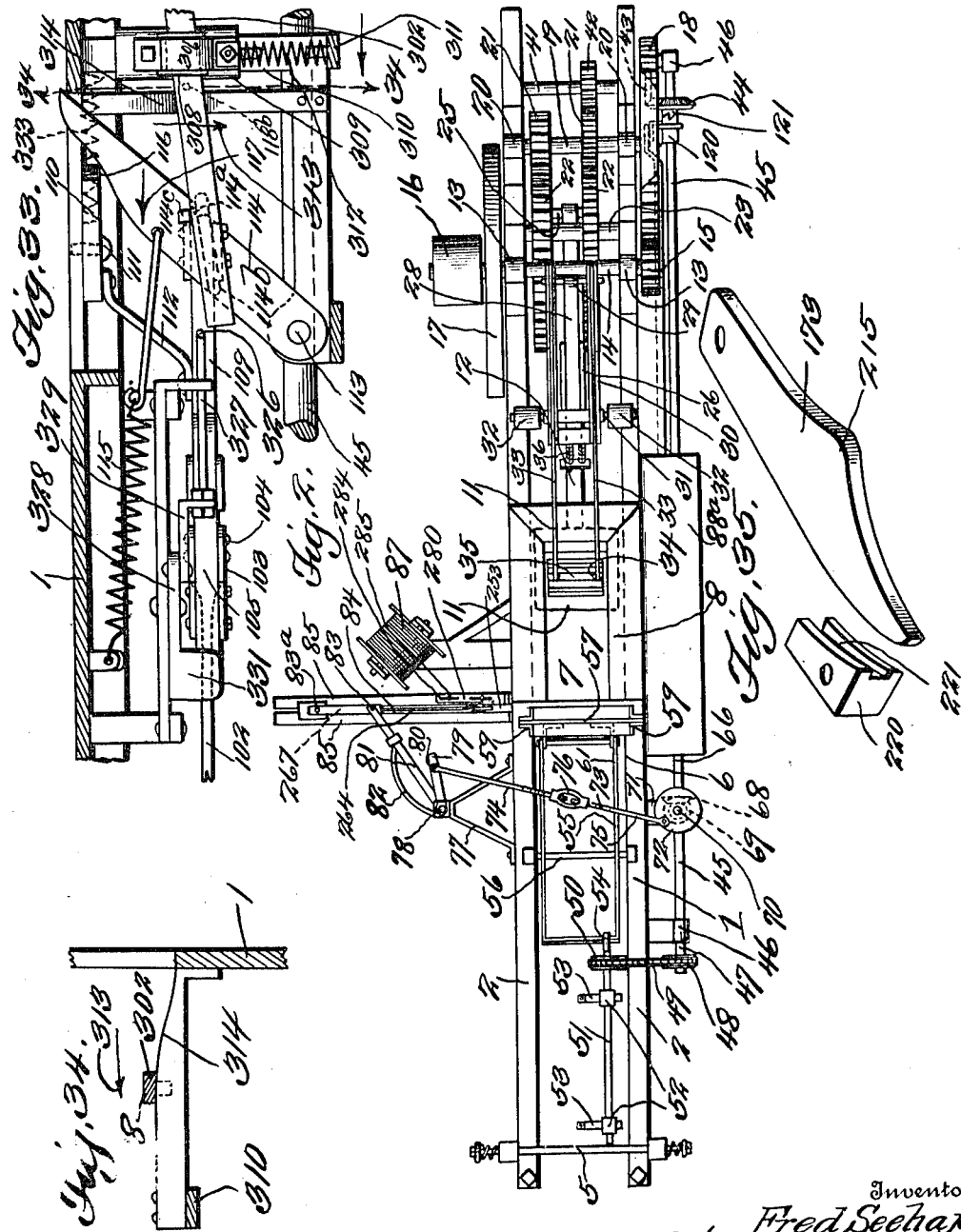

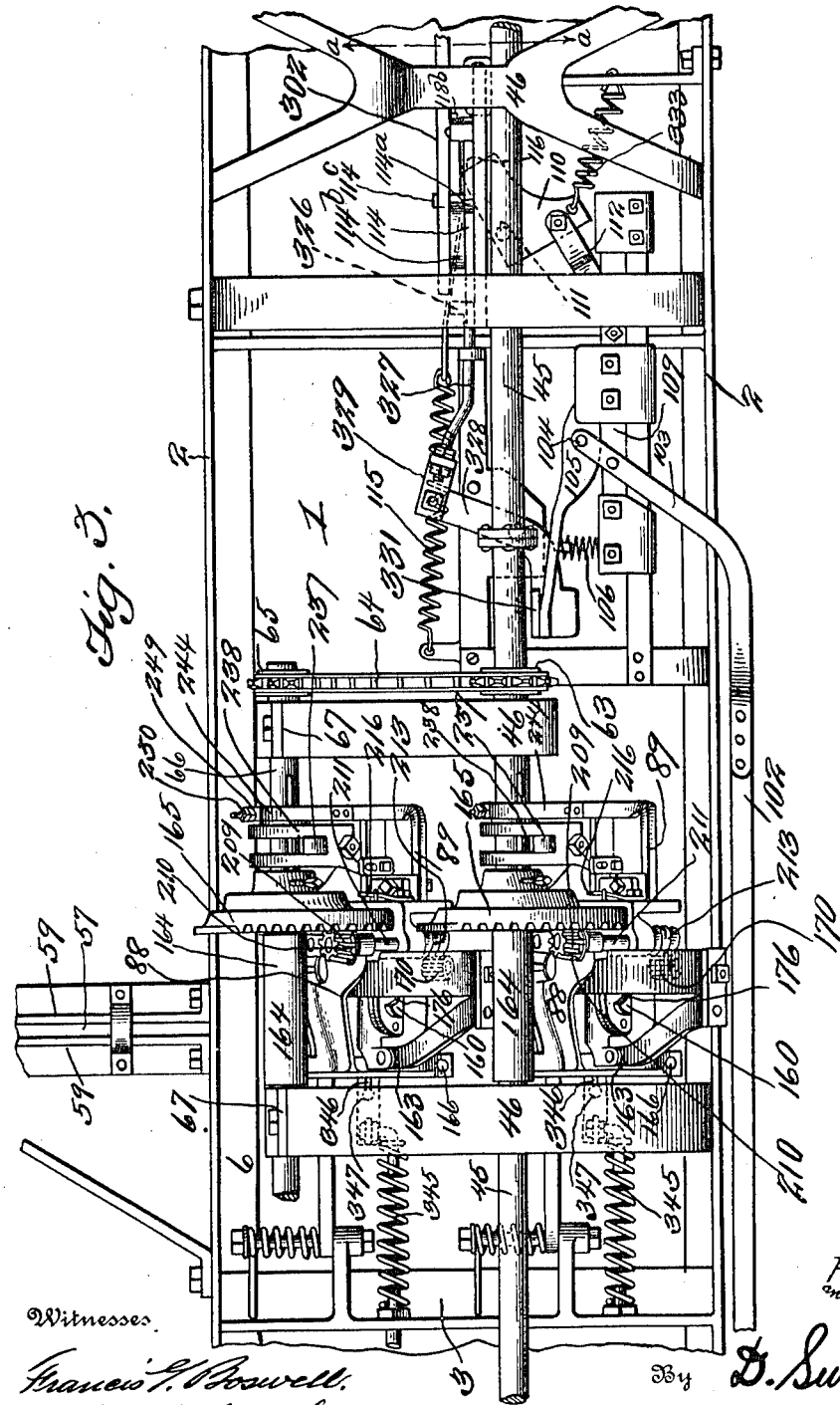

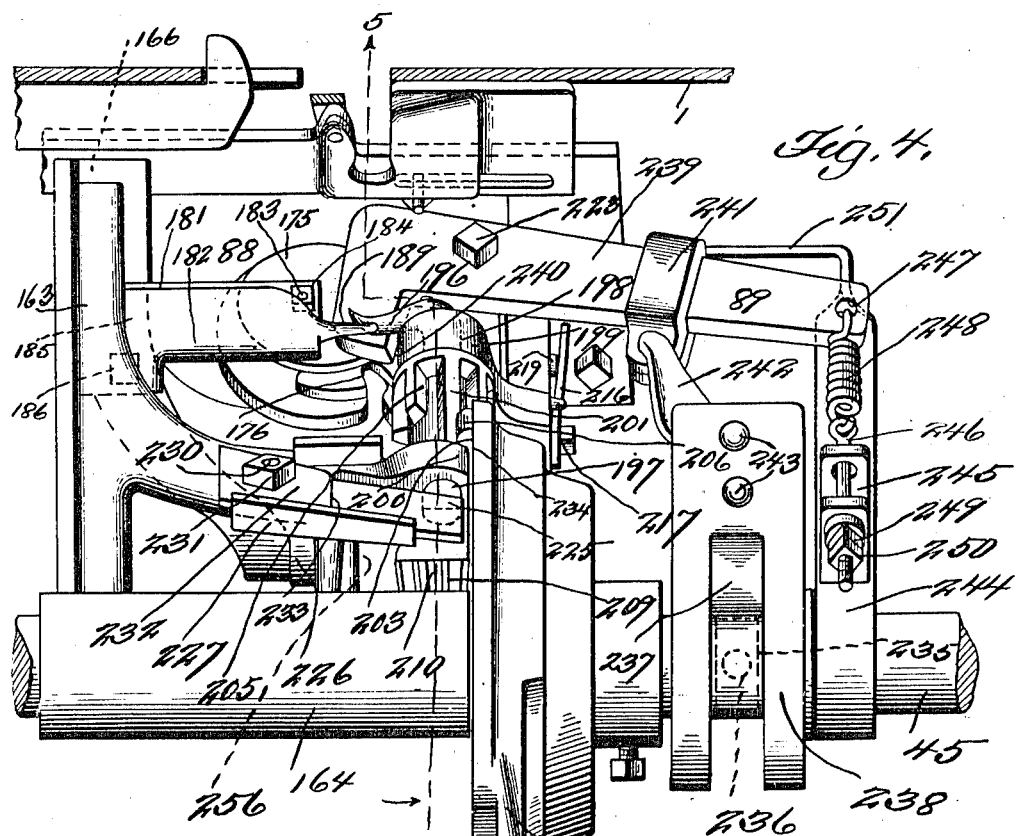
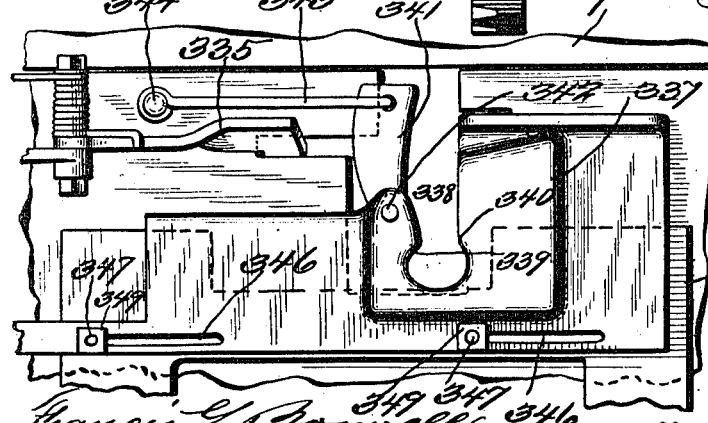

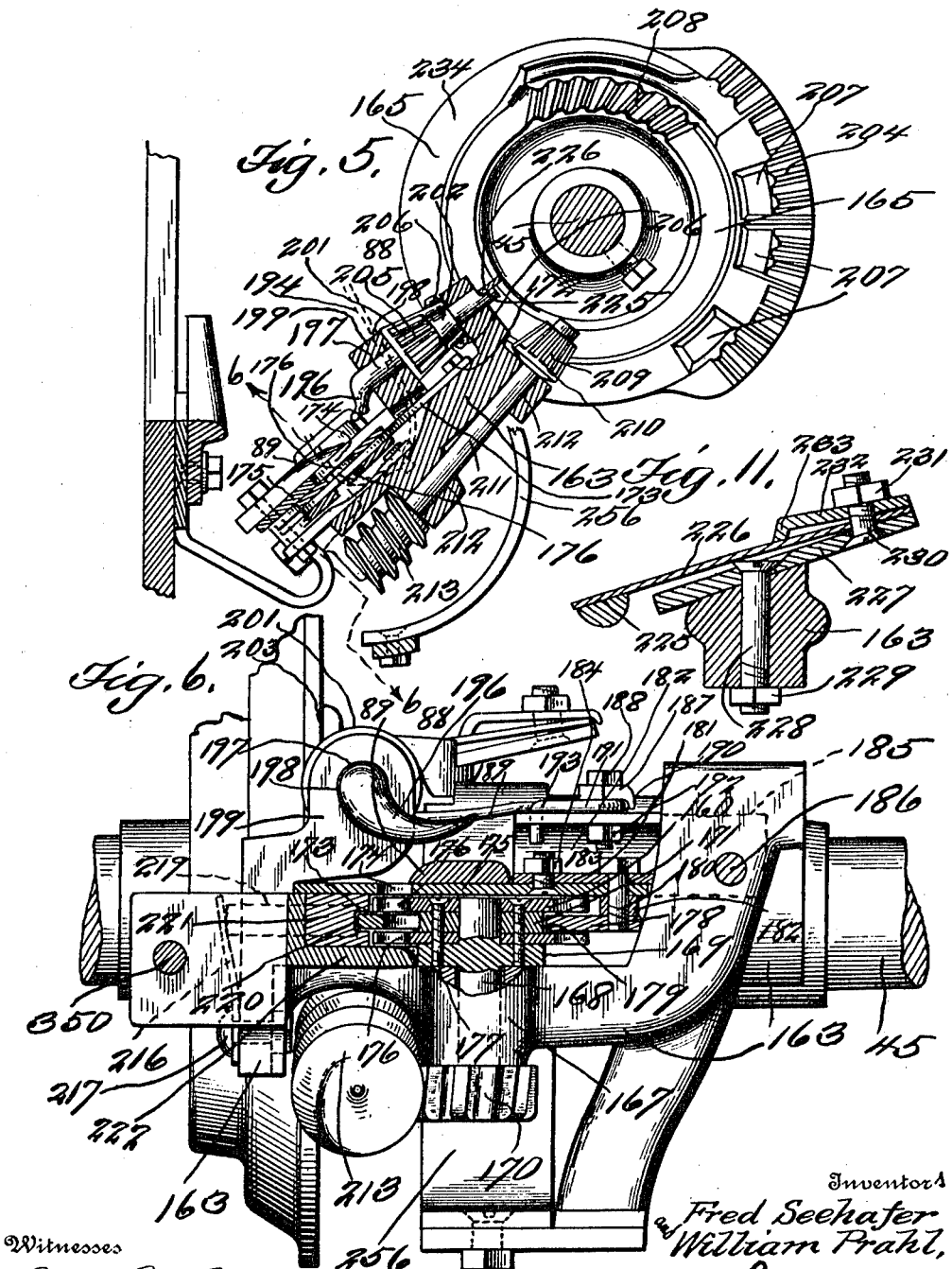

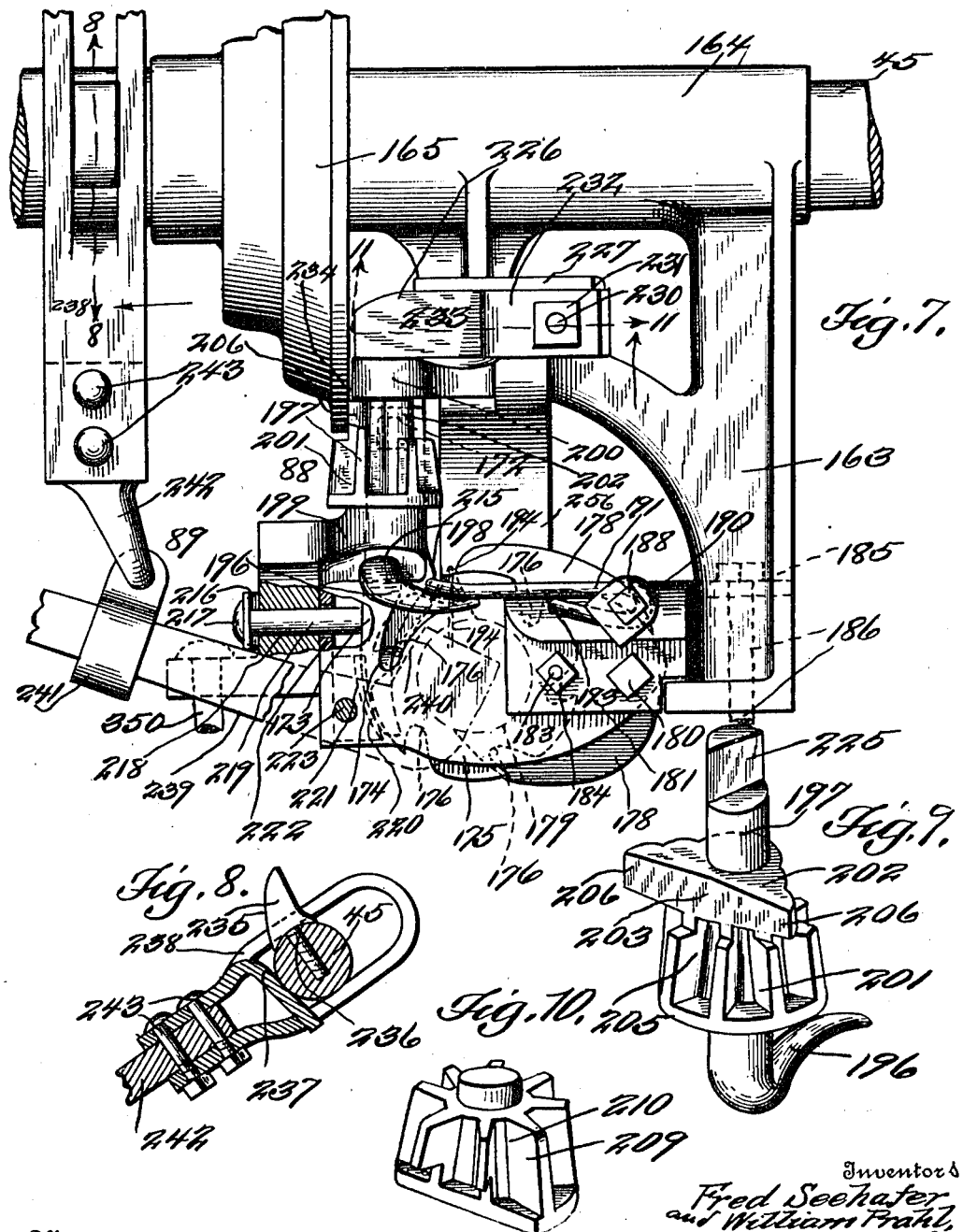

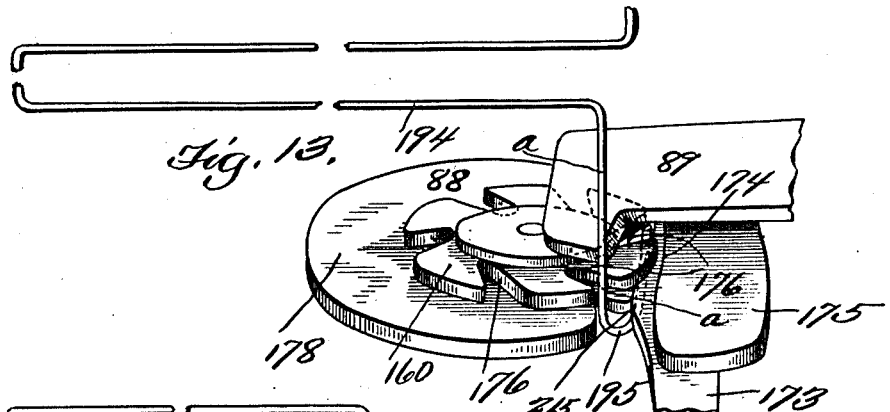
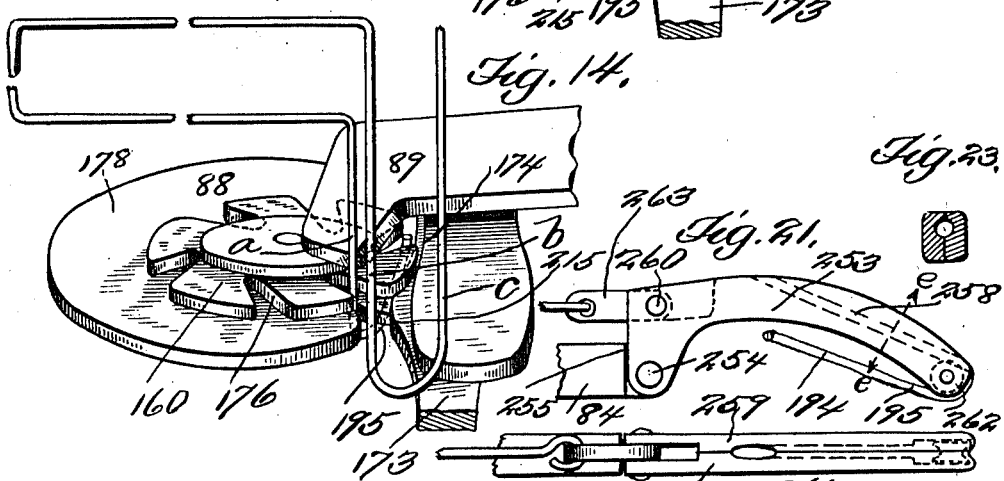
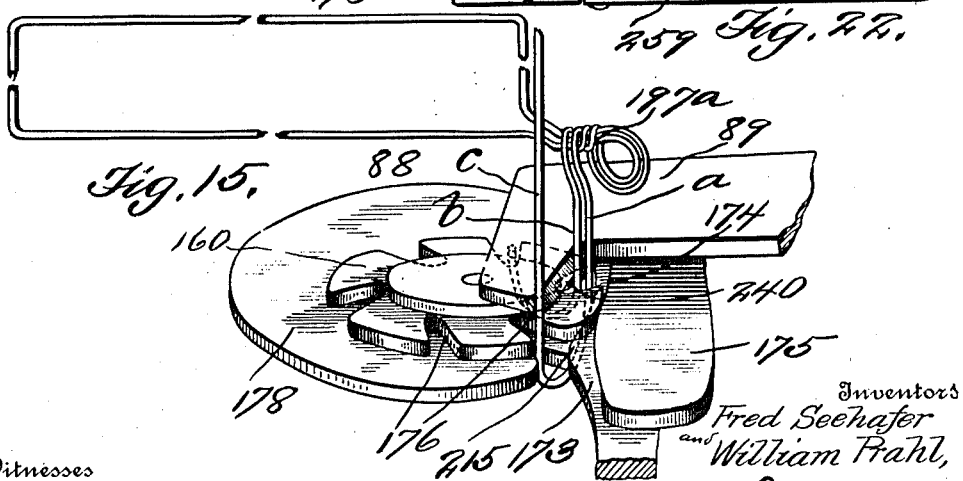

F. SEEHAFER & W. PRAHL.
HAY PRESS.
APPLICATION FILED JAN. 19, 1912.

1,040,786.

Patented Oct. 8, 1912.
11 SHEETS—SHEET 8.

Inventors
Fred Seehafer
and William Prahl,

Witnesses

By D. Swift & Co.
Attorneys

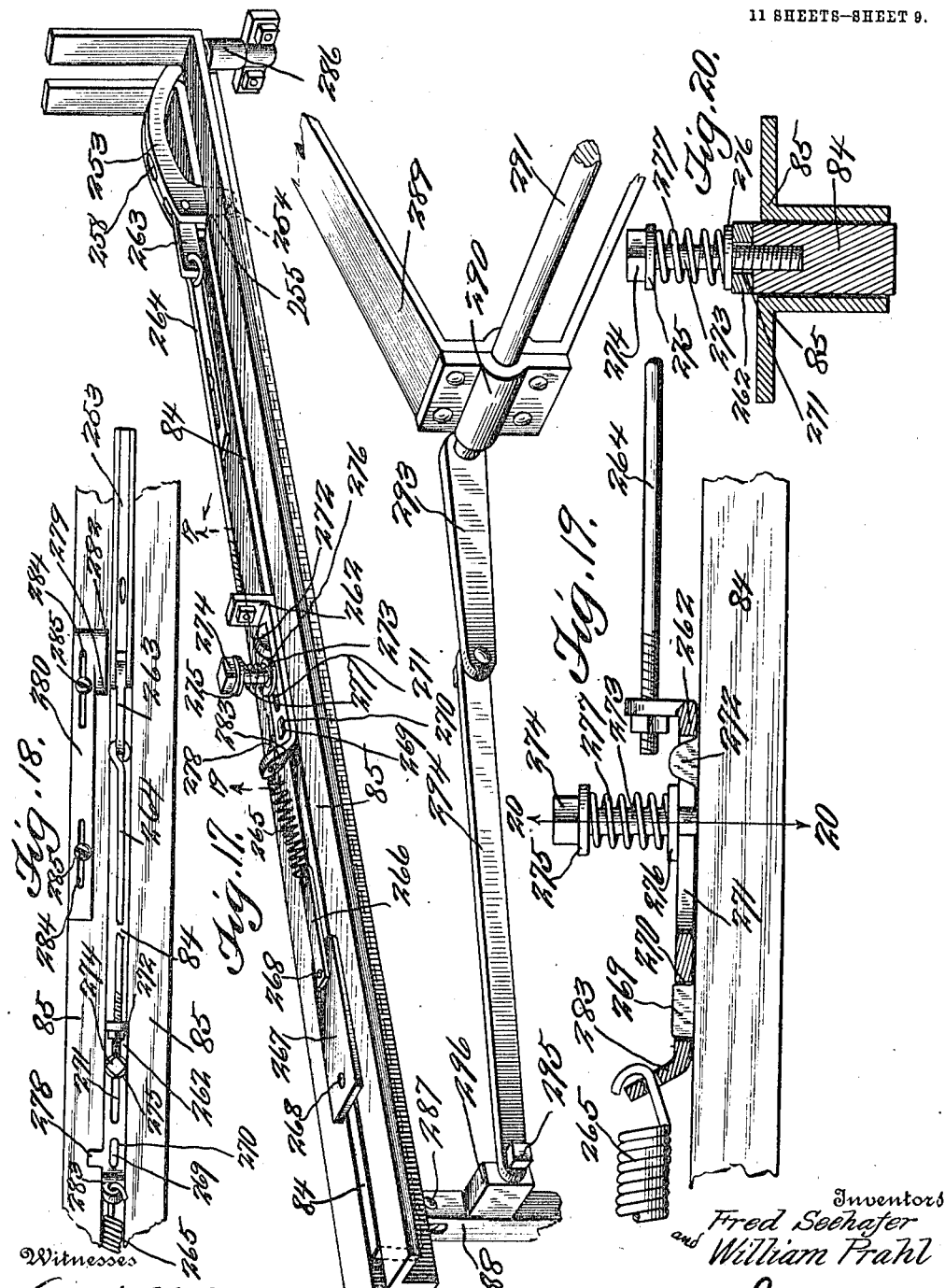

F. SEEHAFER & W. PRAHL.
HAY PRESS.
APPLICATION FILED JAN. 19, 1912.
1,040,786.
Patented Oct. 8, 1912.
11 SHEETS—SHEET 10.
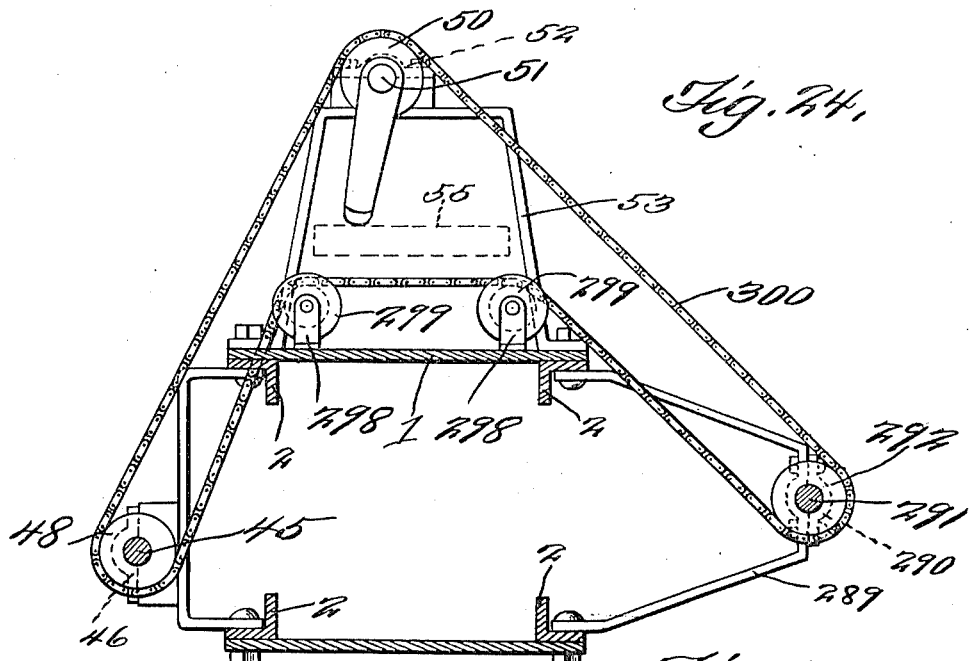
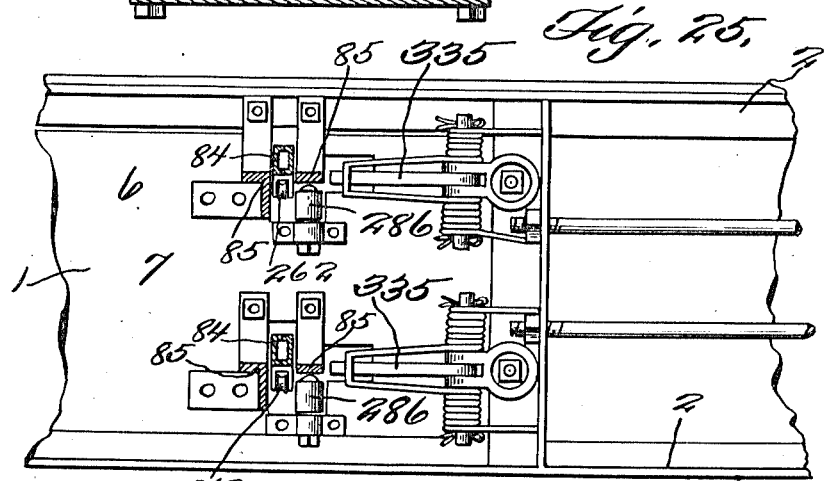
Witnesses
Francis V. Boswell
C. E. Frothingham
Inventors
Fred Seehafer
and William Prahl,
By D. Swift &Co.
Attorneys F. SEEHAFER & W. PRAHL.
HAY PRESS.
APPLICATION FILED JAN. 19, 1912.
1,040,786.
Patented Oct. 8, 1912.
11 SHEETS—SHEET 11.
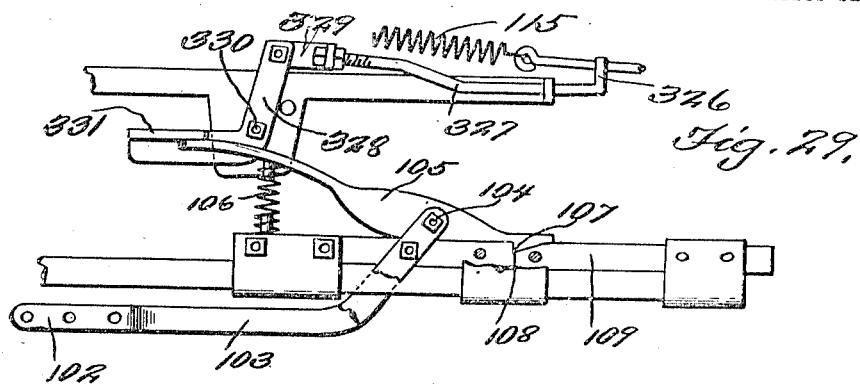
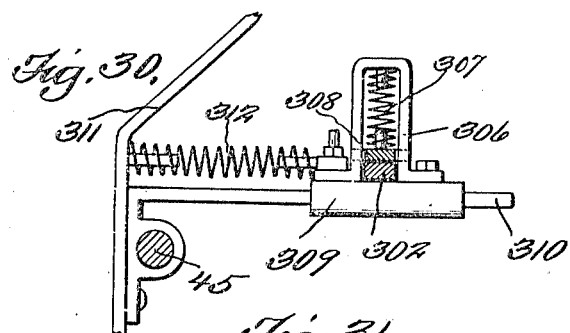
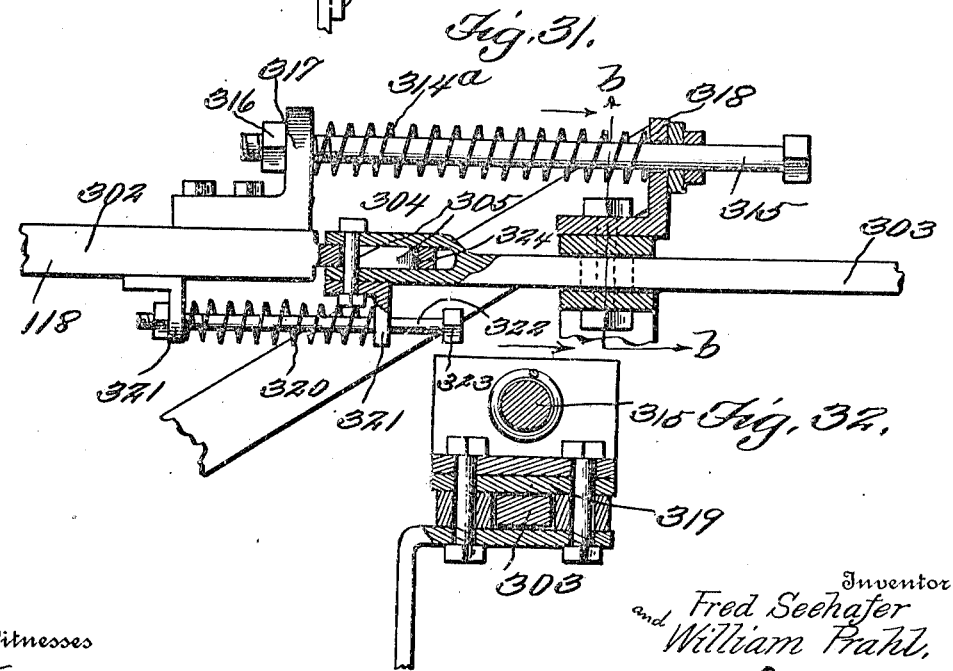
Witnesses
Francis Y. Boswell
C. E. Frothingham
Inventors
Fred Seehafer and William Prahl,
By D. Swift
Attorneys

UNITED STATES PATENT OFFICE.

FRED SEEHAFER AND WILLIAM PRAHL, OF MARSHFIELD, WISCONSIN.

HAY-PRESS.

1,040,786. Specification of Letters Patent. Patented Oct. 8, 1912.

Application filed January 19, 1912. Serial No. 672,092.

*To all whom it may concern:*

Be it known that we, FRED SEEHAFER and WILLIAM PRAHL, citizens of the United States, residing at Marshfield, in the county of Wood and State of Wisconsin, have invented a new and useful Hay-Press; and we do hereby declare the following to be a full, clear, and exact description of the invention, such as will enable others skilled in the art to which it appertains to make and use the same.

This invention relates to a new and useful hay pressing and baling machine.

The invention in its broadest scope aims as its primary object to provide such a machine by which the bales of hay will be uniform in size, when discharged.

A further object of the invention is the saving of considerable binding wire on each bale.

A further object is the fact that much lighter wire may be used for binding the bales than heretofore utilized.

A further object of the invention is the provision of a machine of this nature which will save the labor of several men.

It is a further object of the invention to provide a press in which the feeding of the hay or the like into the hopper is continuous and automatic while a previous bale is being tied.

A further object of the invention is to provide a more efficient and practical baling press, of a capacity considerably greater than any other press at the present in practical use.

The press receives power at one point, which starts the various attendant moving parts into operation, for instance, the feeding, the compressing of the hay, the baling or binding thereof, the tying and severing of the wire, is brought consecutively and coordinately into play.

A further feature of the invention is the fact that certain parts of the press are thrown out of gear for a short time, at certain periods, while the feeding and the pressing of the hay is conducted.

Another feature of the invention is the production of a simple, efficient, practical and desirable knotter, which is thrown automatically and intermittently in and out of operation subsequently to the completion of the bale, which knotter or twister is automatically threaded by a wire threading mechanism, which is also thrown automatically and intermittently in and out of operation. This wire threading mechanism is another efficient, practical and desirable feature of the baling press. When the wire threading mechanism threads another part of the wire to the knotter, in order that the knot or twist may be formed, it also threads the knotter with another portion of the wire to surround another bale when it is forced into the bale chamber, as the previous bale is forced out. At the same time the knotter is so threaded, the two portions of the wire beyond the knot or the twist are severed by the severing mechanism.

In the drawings there is disclosed only one form of the invention, but in practical fields this form may necessitate alterations, to which the patentees are entitled, provided the alterations are comprehended within the scope of what is claimed.

The invention comprises further features and combination of parts, as hereinafter set forth, shown in the drawings and claimed.

In the drawings:—Figure 1 is a view in side elevation of a baling press, showing substantially the general construction of the same, the parts thereof being diagrammatically illustrated. Fig. 2 is a plan view of Fig. 1, showing the parts of the baling press in diagrammatic outline. Fig. 3 is an enlarged view in side elevation of a portion of the machine, showing some of the essential parts thereof. Fig. 4 is an enlarged plan view of the knotter and severing mechanism. Fig. 5 is a sectional view approximately on line 5—5 of Fig. 4. Fig. 6 is a sectional view on line 6—6 of Fig. 5, showing several parts of the knotter in elevation. Fig. 7 is a plan view of the knotter, taken on a different angle to that shown in Fig. 4. Fig. 8 is a sectional view on line 8—8 of Fig. 7, showing the cam lug on the shaft 45 for operating a reciprocating loop strap, which in turn actuates the severing knife. Fig. 9 is a detail view of a mutilated pinion (which is operated by a mutilated gear on the shaft 45), which mutilated pinion in turn actuates the distorted knotting tongue. Fig. 10 is a detail view of another mutilated pinion (which is also actuated by the mutilated gear) for actuating the disks 160. Fig. 11 is a sectional view on line 11—11 of Fig. 7, showing the spring for holding the spindle of the knotting tongue shown in Fig.

Figure 27:
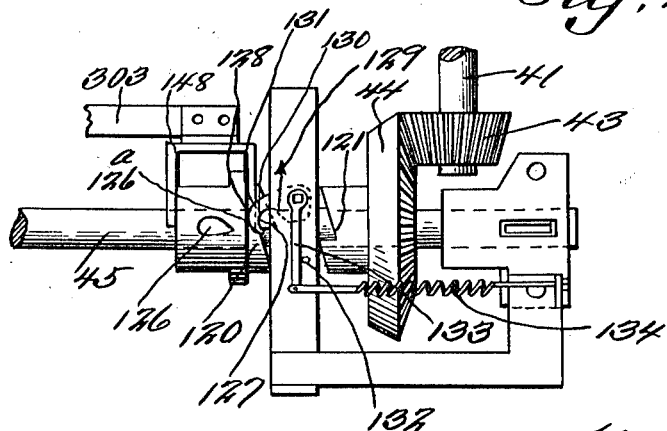
Figure 16:
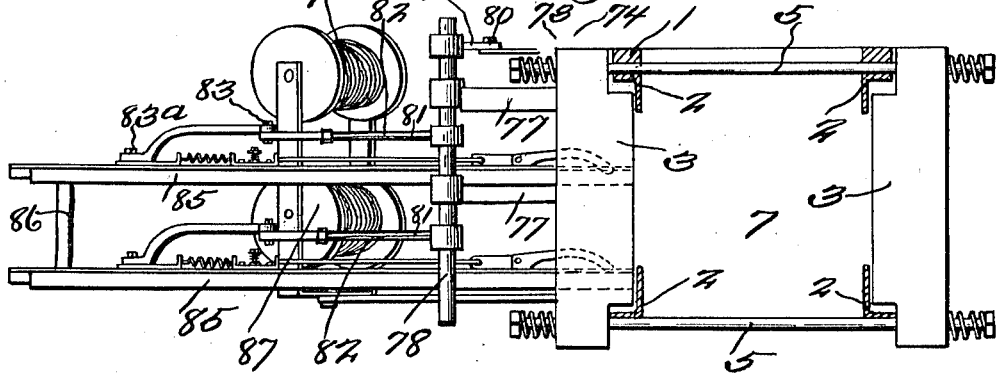
Figure 28:
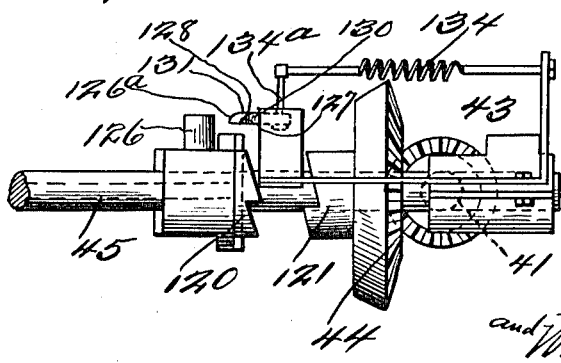

9 in position. Fig. 12 is a detail view in elevation of a plate, which is reciprocated by the wire, which surrounds the end of the bale as it is being formed and forced into the bale chamber, in order to remove the previously twisted wire from the knotting tongue. Fig. 13 is a detail perspective view in diagrammatic outline, of portions of the knotter, showing the first threading of the same with the wire. Fig. 14 is a view similar to Fig. 13, showing the second step for threading the wire to the knotter the second time. Fig. 15 is a view similar to Figs. 13 and 14, showing the third step in threading the knotter the third time, and also illustrating the two parts $a$ and $b$ of the wire being knotted or twisted, and showing the parts $c$ of the wire in readiness to pass about the forward end of the bale. Fig. 16 is a view in elevation of the wire threading mechanism, showing the needles thereof, about to pass transversely of the press, which is partly shown in this figure. Fig. 17 is a perspective view of one of the needles, and its guides, showing the attendant coöperating parts of the needle, and further illustrating the preferred structure for operating the needles. Fig. 18 is a plan view of a portion of the structure shown in Fig. 17. Fig. 19 is a sectional view on line 19—19 of Fig. 17. Fig. 20 is a sectional view on line 20—20 of Fig. 19. Fig. 21 is a detail view in elevation showing one of the needle tips. Fig. 22 is a plan view of the needle tip shown in Fig. 21. Fig. 23 is a transverse sectional view on line $e$—$e$ of Fig. 21. Fig. 24 is a transverse sectional view of a portion of the frame of the baler, showing the preferred form of mechanism for operating the needles. Fig. 25 is a detail view in elevation, and partly in section of a portion of the machine, showing the jaws for retaining the bale in its chamber, while the divider is in a raised position, and illustrating the guides for the needles. Fig. 26 is a detail view of one of the jaws for retaining the bale in its chamber. Fig. 27 is a plan view of the clutch mechanism for the rear end of the shaft 45. Fig. 28 is a view in elevation of the clutch mechanism. Fig. 29 is a view in elevation, partly broken away and partly in section of the mechanism to be released, to permit the clutch to operate. Fig. 30 is a sectional view on line $a$—$a$ of Fig. 3, showing the means for retaining the bar 118 in its normal position, before the throwing of the clutch in Fig. 27. Fig. 31 is a view partly in section and partly in elevation of the means for forcing the clutch in Fig. 27 in and out of action. Fig. 32 is a sectional view on line $b$—$b$ of Fig. 31. Fig. 33 is a plan view, partly in section, of the means actuated by the plunger for operating the bar 118. Fig. 34 is a sectional view on line 34—34 of Fig. 33. Fig. 35 is a view showing the guide lever 173 and the block 221. Fig. 36 is a plan view of the chain 94.

Referring to the drawings, 1 designates the frame of the baling press, which is elongated as a preferable form of the frame, and comprises the angle bars 2, which are held spaced apart by the vertical members 3. The bars 2 are held spaced apart horizontally by the rods 5. At the central portion of the frame, the same is boxed in, as shown at 6, so as to provide a bale chamber 7. Arranged above the bale chamber is a hopper 8, through which the hay is fed by the packer 9. The plunger 11 is guided upon the angle bars 2, and carried by the plunger rod 12.

Mounted in bearings 13 of the upper bars 2 is a shaft 14, on one end of which a gear 15 is carried, while on the other end a pulley 16 and fly wheel 17 are carried. The gear wheel 15 meshes with a gear wheel 18, which is movable with the shaft 19. The shaft 19 is mounted in bearings 20 of the rear portions of the angle bars 2. Movable with the shaft 19 are a pair of gears 21, which are spaced apart, and which are in mesh with the gears 22. The gears 22 are mounted on the shaft 23, which is journaled in the bearings 24 of the lower angle bars 2. The plunger rod 12 is pivoted to a pin 25, which connects between the gears 22. It will be noted, however, that as the gears 22 rotate, the plunger 11 is reciprocated back and forth in the bale chamber.

Carried by and projecting upwardly from the plunger bar is an arm 26. Pivoted to the upper end of the arm 26, as at 27, is a link 28, which, in turn, is pivoted at 29 to the vertical oscillatory walking beams 30. These walking beams are pivoted at 31 to the standards 32. Slidable in the beams 30 are the beams 33, which are pivoted at 34 to the shank 35 of the packer 9. The screws 36 are designed for the purpose of holding the beams 33 in adjusted positions in the beams 30. Beams 37 are pivoted at 38 to the shank 35 of the packer 9 and to the standards 32, as at 39. If the beams 33 are adjusted inwardly of the beams 30, the packer will enter the hopper on an angle, and by means of the beams 37, this angle will be maintained as the packer enters the hopper. If the beams remain adjusted as shown in Fig. 1, the packer will enter the hopper exactly vertical, and the beams 37 will hold it vertical throughout its entire movement. It will be noted that when the plunger bar is approximately horizontal, the packer will be thrown clear of the hopper, whereby the hay may be thrown therein. When the pivot 25 of the plunger bar assumes the position approximately vertically over the shaft 23, the packer will be forced into the hopper and the bale chamber, so as to thoroughly pack the hay.

When the pivot 25 is in the rear of the shaft 23, the packer will be slightly withdrawn from the hopper. However, when the plunger bar 12 is in approximately horizontal position, as hereinbefore stated, with the pivot 25 in front of the shaft 23, the plunger 11 will have discharged the bale of hay.

Mounted in bearings 40 of the lower angle bars 2 is a shaft 41, with which rotates a gear 42, which meshes with one of the gears 22, as shown in the plan view of Fig. 2. Also movable with the shaft 41 is a bevel pinion 43, which, in turn, meshes with the bevel pinion or gear 44. This bevel pinion 44 is loosely journaled on the shaft 45. The shaft 45 is mounted in suitable bearings 46, as shown. The end 47 of the shaft 45 has a sprocket 48 to move therewith, about which the chain 49 travels, which, in turn, travels about the sprocket 50. The sprocket 50 is mounted on the shaft 51, which is journaled in bearings 52 of the frame 53. One end of the shaft 51 terminates into a crank handle 54, which coöperates with the oscillatory frame 55, pivoted at 56, so as to raise the divider 57. The frame 55 is pivoted at each side, as shown at 58, to the divider. This divider is mounted in the guides 59, and is designed to enter the bale chamber at its forward end, so as to divide the bales of hay as they are compressed. Connecting between the frame 55 and the frame 1 is a spring 60, which permits the heavier end 61 of the frame 55 to gradually lower and with it the divider 57, that is, when the crank handle 54 is thrown from the path of the frame 55. Also movable with the shaft 45 is a sprocket 63, about which the chain 64 travels, which, in turn, moves over the sprocket 65. This sprocket 65 is carried on and movable with the shaft 66, which is mounted in bearings 67. One end of the shaft 66 is provided with a bevel gear 68, which, in turn, meshes with the bevel gear 69 of the stub shaft 70, which is mounted in the bearing 71. A disk 72 is movable with the shaft 70, and eccentrically connected to the disk is a rod connection 73. This rod connection consists of two sections of rods 74 and 75, connected by a turn buckle 76, whereby the rod connections may be lengthened or shortened.

Mounted in a pair of bracket frames 77 is a shaft 78 on the upper end of which an arm 79 is provided. This arm 79 is pivoted to the section 74 of the rod connection, as at 80. Also movable with the shaft 78 is a pair of arms 81, which are braced relatively to the shaft 78 by the braces 82. The free ends of the arms 81 are pivoted at 83 to the needles 84, which are designed to reciprocate in the angular guides 85, which are braced relatively to one another by the rods 86. These needles are designed to penetrate the bale chamber at certain times, so as to feed the baling wire transversely of the bale chamber from the reels 87, whereby the ends of the wire may be brought into positions to be caught by the knotters or twisters 88, after which the needles recede from the bale chamber. The knotters and the adjacent mechanism in Figs. 1 and 2 are covered by a shield 88ª. After the bale of hay has been properly pressed to the desired size, the same is fed forward by the plunger 11. Subsequently, the needles again penetrate the bale chamber and draw the wires around the rear end of the bale, and again attach the wires to the knotters where they are knotted or twisted and then severed by the severing mechanism 89.

Mounted on a stub shaft 92 is a sprocket wheel 93, about which the chain 94 travels. This chain also moves about the sprocket wheel 96 of the stub shaft 97. The chain 94 is provided with fingers 98 which contact with the trip dog 99, which is pivoted at 100, to the frame 1. Pivoted at 101 to the trip dog is a rod 102, the end portion 103 of which is upwardly turned and pivoted at 104 to the lever 105, which, when manipulated, places the spring 106 under tension, so as to return the lever 105 to the position shown in Figs. 3 and 29. The rear end of the lever 105 is provided with a shoulder 107, which coöperates with a notch 108 of the block 109, for actuating the same. This block 109 has connected between it and the dog 110 (which is pivoted at 111 to the frame of the machine) a link 112. Pivotally mounted at 113 is a lever 114, which, when moved to the position shown in Fig. 33, by the plunger 11, places the spring 115 under tension. The dog 110 is so pivoted that its nose 116 may be thrown in the path of the lever 114, to hold the lever 114 in the position shown in Figs. 3 and 33, for a certain period of time. When the nose 116 of the dog 110 is removed from the path of the lever 114, the spring pulls the lever 114 in the direction of the arrow, so as to be in a position to actuate the lever 118, in such a manner that the clutch member 120 is thrown in clutch with the clutch member 121 of the bevel gear 44. When the lever 118 is reciprocated, the clutch member 120 is thrown in gear with the clutch member 121. As the clutch member 120 is moved, the stud 126 contacts with the cam surface 126ª of the dog 128, so as to actuate the dog in the direction of the arrow 129, whereby the stud may be received in the crotch 130 of the dog. This action holds the two clutch members in gear, for an instant, or rather until the shaft 45 begins to revolve, then the stud 126 is forced from the crotch 127 of the dog whereby the two clutch members will rotate together. As the clutch members rotate together, they are held in gear with each other until the shaft 45 completes its revolution, because the lever 114 (which is operated by the plunger) contacts with the enlargement 118ᵇ on the lever 118. As the shaft 45 completes its revolution, the stud 126 contacts with the rear surface 131 of the dog 138, and assists in disconnecting the clutch members 120 and 121 substantially following the releasement of the enlargement of the lever 118 from the lever 114. The part 303 of the lever 118 is provided with an angled forked end 148, which embraces the clutch member 120, so as to throw the two clutch members in gear, when the lever 118 is reciprocated. When the shaft 45 completes its revolution and the stud 126 contacts with the surface 131 of the dog 130, the pin 132 acts as an abutment for the arm 133 on the pin 134ᵃ of the dog 130. However, when the two clutch members are thrown in gear, because of the sliding action of the clutch member 120, the dog 130 is swung on its pivot, against the action of the spring 134, by reason of the fact that the stud 126 oscillates the dog in the direction of the arrow 129. The spring 134 returns the dog 130 to its normal position, as shown in Fig. 27.

*Knotting mechanism.*—The knotter or twisting mechanism 88 comprises a frame 163, which is formed with a sleeve 164, through which the shaft 45 extends. There are two knotting or twisting mechanisms, each having the frames and sleeves 163 and 164. The upper sleeve 164 is journaled on the shaft 66. Both the knotters are constructed alike, therefore, only one is described in detail. However, the same reference numerals indicate the corresponding parts in each knotter.

Keyed to the shafts 45 and 66 are duplicate mutilated gears 165, which, as the shafts 45 and 66 rotate, operate the knotting mechanisms. The frames 163 are braced relative to the frame of the press, as at 166, shown in Fig. 3, or by any other suitable means. Journaled in a suitable bearing 167 of each frame is a pin shaft 168 having an integral annular collar 169. Fixed by any suitable means (not shown) to the lower end of the pin shaft 168 is a worm gear 170. The disk plates 160 receive the pin shaft 168 through their central portions, as shown in Fig. 6, there being a collar 171 arranged between them, for holding them spaced apart. The disk plates 160 are held spaced apart for the purpose of permitting the lever guide pivoted at 172 to operate. This guide is designated by the numeral 173, and constitutes means for holding and guiding each part of the wire as it connects to the knotter, into the guide recess 174 of the plate 175, and into the edge recesses 176 of the disk plates 160. Screws or other suitable means 177 penetrate the disk plates and the collar 171, and into the collar 169, in order to fixedly connect the disk plates to the pin shaft 168, so as to move therewith. The plate 175 is secured to the plate 178, which is formed with the semi-circular edge cut or recess 179 to receive the collar 171, thus constituting means for assisting in holding the pin shaft steady. The bolt 180 for securing the plate 175 to the plate 178 also secures the plate 181 to the plate 175, there being a collar 182 for holding the plates 175 and 178 separated. The plate 181 is formed with an upwardly extending approximately curved portion 182 on one side, and is further secured to the plate 175 by the screw bolt and nut 183 and 184. The upwardly extending curved portion 182 is formed with an extension 185, shown in dotted lines in Figs. 6 and 7, and which is secured to the frame 163 by the bolt 186. In Figs. 6 and 7, the nut for this bolt is not shown. Secured to the upstanding curved portion of the plate 181 by a nut 187 and bolt 188 is a finger 189. The nut 187 is formed with a lip 190 to engage the loop 191 of the finger, so as to hold the loop firmly in position on the bolt 188. A nut 192 is threaded to the bolt 188. An extension 193 of the loop 191 extends downwardly through the curved portion of the portion 182, in order to hold the finger 189 stationary. In Fig. 4, however, the finger 189 is made a part of the upwardly extending portion 182. This finger constitutes a support for the wire 194, when the crooked end 195 in Fig. 13 is first inserted in two of the edge recesses 176 of the plates 160. The finger also supports the other portions of the wire when being connected in the edge recesses of the disk plates 160. The object of thus supporting the wire is to hold the same in position to be caught by the knotting tongue 196, whereby the two parts *a* and *b* of the wire may be twisted or knotted, as shown in Fig. 15, which knot is denoted by the numeral 197ᵃ. The spindle 197 of the knotting tongue 196 is mounted in a bearing 198 of an extension 199 of the frame or casting 163. The spindle 197 is journaled in another extension 200 of the frame 163. Fixed to rotate with the spindle 197 is a mutilated pinion 201. The mutilated pinion 201 is arranged between the extensions 199 and 200. This mutilated pinion is formed with an enlargement 202 having a flat surface 203, which engages the plain face of the mutilated gear 165, as shown in Figs. 5 and 7, that is, while the parts *a*, *b*, and *c* of the wire 194 are being arranged in the edge recesses of the disk plates 160. However, after the parts *a*, *b* and *c* have been arranged in the edge recesses of the plates 160, it is time for the knotting tongue to operate. At this period the shaft 45 has been rotated sufficiently to bring the teeth 204 of the mutilated gear 165 in mesh with the teeth 205 of the pinion 201, thus causing the pinion to rotate, which, in turn, rotates the spindle 197 of the knotting tongue 196, which will twist the parts a and b of the wire to form the knot 197ª. When the mutilated pinion 201 is rotated, the extensions 206 of the enlargement 202 register with and engage in the recesses 207 of the mutilated gear 165. However, substantially at the time the teeth 204 engage the pinion 201, the teeth 208 engage the teeth 209 of the pinion 210, on the shaft 211, thus imparting the rotary movement thereto. This shaft 211 is mounted in bearings 212 of the frame or casting 163. When the shaft 211 rotates, the worm 213 thereon meshes with the worm gear 170, thus imparting motion to the pin shaft 168, and by reason of the fact the disk plates are rotatable with the pin shaft, the edge recesses of the disk plates, in which the parts a and b of the wire in Fig. 14 are arranged, are brought to a position, as shown in Fig. 15, and at this same time the parts c of the wire are left in two other recesses of the said disk plates. Substantially at the same time the knot or twist 197ª in Fig. 15 is being formed by the knotting tongue 196.

The parts a, b and c of the wire are held in the edge recesses and guided into the guide recess 174 of the plate 175 by the guide lever 173 (which is formed with an edge bulge 215, which insures the guiding of the wire into the edge recesses). However, this guide lever is under tension of the spring 216, which is secured at 217 to the frame 163. Slidably mounted in a bearing 218 of the frame is a pin bolt 219, which is interposed between the guide lever and the spring 216. It will be understood that, as the parts a, b and c of the wire are guided in the guide recess, the spring 216 is placed under tension, thus causing the guide lever to return to its normal position. The free end of this guide lever operates in a groove 220 of a block 221, which is secured between the plate 175 and the angle plate 222, by means of the bolt 223. This guide lever and block are shown in detail in Fig. 34. The end of the spindle 197 is cut away to form a flattened portion 225, which is engaged by the free ends of the spring 226. This spring is secured to the holder 227 (which in turn is bolted to a portion of the frame 163, by the bolt and nut 228 and 229), by the screw bolt 230, there being a nut 231 threaded thereon. Between the nut 231 and the spring 226 is a plate 232 having an angle end 233, bearing against the spring. The spring 226 is formed from a piece of sheet metal, and the tension thereof is increased by the angle end 233 bearing on the spring. This spring 226 offers resistance and tension for the spindle 197, as the mutilated pinion 201 is being rotated. The flat surface 203 of the enlargement 202 of the mutilated pinion is held in engagement with the plain surface 234 (which extends substantially three quarters of the way around the mutilated gear) by means of the spring 226. The teeth 204 of the mutilated gear are offset from the body of the gear, while the teeth 208 are inset on the body of the gear.

*Wire severing mechanism.*—Instantly following the knotting of the parts a and b of the wire, the severing mechanism 89 is brought into action. To operate the severing mechanism, a cam lug 235 secured by any suitable means 236 to the shaft 45, contacts with the cam tongue 237 of the loop strap 238, which imparts a movement to the strap in the direction of the frame of the press. When this movement is thus imparted to the strap, the knife 239 (which is pivoted on the bolt 223) oscillates upon its pivot, thus causing the cutting edge 240 to sever the parts a and b of the wire. The knife 239 is provided with a strap 241, which is connected to the loop strap 238 by the member 242, which, in turn, is secured between the two parts of the strap, by means of the bolts 243. Loosely mounted on the shaft 45 is a hanger 244, having a U-shaped bracket 245 carried thereby. Mounted in the arms of the bracket 245 is an eye pin 246, between the eye of which and an aperture 247 of the handle of the knife, a spring 248 is connected. When the knife 239 is actuated by the cam lug, the spring is placed under tension, so that after the cam lug 235 passes the cam tongue 237, the knife will be returned to its normal position. The eye pin 246 has threaded thereon a securing nut 249 and a lock nut 250. By adjustment of the nuts 249 and 250, the tension of the spring 248 may be increased or decreased, as the case requires. The hanger 244 at its end portion 251 is secured by any suitable means (not shown).

*The wire threading mechanism.*—The needle threaders 84 are provided with needle tips 253, which are pivoted thereto, as at 254, there being shoulders 255 to limit the upward movement of the free ends of the needle tips. It will be observed, however, the needle tips are allowed to oscillate downwardly, when coming in contact with the curved deflector cam strap 256 of the knotter, whereby the wire 194 may be caught in the edge recesses of the disk plates 160. When first starting the machine, the free end of the wire 194 is inserted through the bore 258 of the needle tip. This bore extends on a bias through the tip. Journaled on a pin between the two side portions 259 (which are fastened together by the rivets 260 and 254) is a grooved pulley 262. The wire, after leaving the bore 258, passes over the pulley 262, that is, on first threading and curves rearwardly under the needle tip.

To hold the needle tip in the position shown in Fig. 17, the rear end of the tip is connected to the slide plate 262 by the link 263 and rod 264. The plate 262 has a spring 265 connected to its rear end, which spring, in turn, is connected to the plate 266. The plate 266 and the plate 267 are secured to the needle threaders 84, as at 268. The spring 265 is placed under tension when the needle tip is forced downwardly on its pivot when coming in contact with the cam strap 256, and when the needle tip is withdrawn from the knotter, the spring 265 returns it to the position shown in Fig. 17. However, before the needle tip contacts with the strap 256, it is held positively in the position shown in Fig. 17 by the lug 269 of the needle threaders 84, which lug enters the opening 270 of the plate 262. The plate 262 is provided with a slot 271. Projecting upwardly from the threaders 84 are the lugs 272, which enter the slots 271, so as to guide the plates. Also projecting upwardly from the threaders 84 are the pins 273, which also pass through the slots of the said plates, and on their upper ends nuts 274 are threaded. Interposed between the washer 275 below the nut 274 and the washers 276 adjacent the said plates, are springs 277, which hold the plates in contact with the threaders 84. An instant before the free ends of the needle tips contact with the straps 256, the lugs 278 of the plates 262 ride up the inclined cam surfaces 279 of the plates 280, thus freeing the openings 270 of the lugs 269, so as to allow the needle tips to be forced downwardly. When the threaders are withdrawn transversely of the press, the lugs 278 ride up the inclined portions 282 of the plates 280. When the threaders are being withdrawn in this manner, the lugs 269 again enter the openings 270. This is accomplished, because the rear ends of the plates 262 are curved upwardly, as shown at 283. The lugs 269 will strike the upwardly curved portions 283 and raise the rear ends of the plates 262, which will permit the lugs 269 to enter the openings 270. The plates 280 are provided with slots 284, through which the screws 285 penetrate. The screws are threaded into the flanges of two of the angular guides 85. These screws constitute means for holding the plates 280 in adjusted positions, whereby the rear ends of the plates 262 may be raised a little before or at the same time the needle tips contact with the straps 256. The threaders 84 pass between the rollers 286, as they move transversely of the press. Fixed rigidly, as at 287, to the rear ends of the threaders 84, as shown in Fig. 17, are extensions 288.

It will be noted that in Figs. 1, 2 and 16 there is one mechanism shown and operated from the shaft 45, for actuating the threaders 84, but in Figs. 17 and 24 another structure is illustrated. This structure consists of the bracket members 289, there only being one shown, which are adapted to be secured to the frame of the press. Mounted in bearings 290 of the bracket member is a shaft 291, on which a sprocket 292 is fixed, as shown in Fig. 24. One end of the shaft 291 is provided with an arm 293, to the free end of which a link 294 is connected. This link 294 is, in turn, pivoted at 295 to the block 296 of the extension 288. Mounted upon the top of the frame of the press are bracket bearings 298, in which are journaled pulleys 299. Passing over the sprockets 48, 50 and 292 and over the pulleys 299 is an endless sprocket chain 300, which, when motion is imparted to the shaft 45, rotates the shaft 291, which, in turn, moves the threaders transversely of the press, by virtue of the connections 293 and 294. After the wire has once been connected to the disk plates 160 of the knotter, such connection always exists, by reason of the fact that the wire is severed beyond where the wire is arranged in the edge recesses of the disk plates 160. When the wire is severed subsequently to the knotting thereof, another portion of the wire remains arranged in the edge recess of the said disk plates 160. After the end of the wire is first connected, the other portions when connected, are in the form of a loop, as shown in Fig. 14.

*Operation.*—Upon first starting the plunger of the press is forwardly positioned adjacent the bale chamber, the divider is raised and also the feeder. The threaders or needles are withdrawn. To start the needles to move transversely of the bale chamber, the trip dog 99 is manually operated, so as to remove the dog 110 from the path of the lever 114, thus permitting it to assume a position in the rear of the plunger. When the lever 114 assumes its position in the rear of the plunger, its notch 114$^a$ receives one end of the enlargement 114$^b$ of the lever 118, so as to be in the proper position to throw the clutch members 120 and 121. After the plunger has moved substantially about eight inches backwardly, it is in contact with the lever 114, and remains in contact therewith for the remainder of its first movement, thus throwing the clutch member 120 in gear with the clutch member 121. Subsequently to throwing the clutch members 120 and 121 in gear, the shaft 45 is rotated for one revolution, by virtue of the meshing of the gears 43 and 44, which gear 43 has power transmitted to it by the chain of gears 15, 18, 21, 22, and 42. The plunger is operated by the gear 22, while the packer is operated because of its connection between it and the pitman connection between the plunger and the gears 22. During this first revolution of the shaft 45, the needles are brought transversely of the rear of the bale chamber, and engage the rearwardly curved ends of the wire 194 in the edge recesses of the disk plates 160 of the knotters or twisters 88. After attaching the wires to the disk plates 160, the hay is fed into the bale chamber by the packer 9. However, the lever 118 consists of two parts 302 and 303, coupled together, as at 304, by a slot and pin connection 305. This slot and pin connection permits the two parts to have a pivotal action with relation to one another. The part 302 is guided in a U-shaped strap 306, as shown in Figs. 30 and 33. A spring 307, arranged in the strap 306, bears against the plate 308, which, in turn, rests upon the part 302 of the lever 118, thus holding the lever down. The U-shaped strap 306 is carried by a slide 309 dovetailed on a portion 310 of a bracket 311 secured to the frame of the press. The slide 309 is normally held in a position adjacent to the frame of the press by the spring 312. When the lever 114 moves the lever 118 rearwardly, a slight lateral oscillatory movement is imparted to the part 302 of the lever 118, using the U-shaped straps 306 as a fulcrum. Just at the time the shaft 45 completes its first revolution, the part 302 reaches the end of its lateral oscillatory movement in the direction of the arrow 313. When the part 302 reaches the end of its lateral oscillatory movement, the same has been slightly raised by the inclined cam surface 314, against the action of the spring 307, and when the part 302 has been fully raised, the end of the enlargement 114$^b$ is thrown out of engagement with the notch 114$^a$ of the lever 114. When this action takes place, the lever 118 returns to the position shown in Fig. 33, because of the action of the spring 314$^a$, shown in Fig. 31. This spring 314$^a$ surrounds a rod 315 which is fixed by a lock nut 316, in the bracket 317 on the part 302 of the lever 118. The end of the rod 315 extends through a fixed bearing 318 of the frame of the press, between which fixed bearing and the bracket plate 317, the spring 314$^a$ coacts. The part 303 of the lever 118 passes through a bearing 318, which is fixed to the frame of the machine. The clutch members 120 and 121 are designed to remain in gear until the shaft 45 fully operates all the parts depending thereon. To insure this action, a spring 320, acting between the bracket plates 321, which are carried by the adjacent coupled ends of the parts 302 and 303 of the lever 118, is provided. This spring 320 surrounds the rod 322, which is fixed at one end with one of the bracket plates 321 and slidable at its other end in the other bracket plate 321. It will be seen that while the spring 314$^a$ is returning the part 302 of the lever 118, the spring 320 is retaining the clutch members 120 and 121 in gear. However, just so soon as the head 323 and the end 324 of the slot and pin connection 305 reach one of the plates 321 and the pin of the said connection 305, the clutch members 120 and 121 are thrown out of gear, thereby permitting the shaft 45 to remain idle for a period of time, for instance, until another bale is ready to be tied. When the dog 110 is moved so as to remove its nose from the path of the lever 114, the lever 114 is thrown in a position by the spring 115 in readiness to operate the lever 118. When the lever 114 is thrown in this position, it contacts with the upturned end 326 of the rod 327, which is connected to one arm of an angled lever 328 by the plate 329. The lever 328 is pivoted at 330, and the lower forward arm of which is formed with an offset plate 331, under which the rear end of the lever 105 is disposed. When the upturned end 326 is contacted with by the lever 114, the angle lever 328 is oscillated, which, in turn, rocks the lever 105, so as to free the shoulder 107 of the notch 108 of the block 109, thereby permitting the spring 333 to return the dog 110 to its normal position, in readiness to hold the lever 114 against being actuated by the spring 115, until the trip dog 99 has been automatically actuated by the finger 98 on the chain 94, at the time when a second bale is ready to be tied and then discharged. The plunger 11, after completing its rearward movement, is moved forwardly, thus forcing the packed hay against the wires. The plunger then forces the hay from the bale chamber into the forward part of the press, and carries the wires with it, the same being disposed along the two sides and one end of the packed hay. The packed hay moves the chain 94 so as to bring the finger 98 in a position in readiness to contact with the trip dog 99. However, after the finger contacts with the dog 99 and trips it, and the plunger has moved approximately eight or ten inches, the divider descends. The needles with the wires (which are in the form of loops) connected thereto again move transversely of the bale chamber. The spring actuated jaws 335 of the usual construction, as shown clearly in Figs. 12, 25 and 26, prevent the bale from rearward movement. Portions of the wire adjacent to the loops are knotted or twisted to the ends of the wires (which were previously connected to the disk plates 160). Other portions of the wires adjacent the loops are then severed, as will be clearly understood from Figs. 7, 13, 14 and 15. The severed portions of the wires (which are cut from the knotted or twisted portions) are attached to the disk plates, at the time the needles have reached their normal positions. The divider then ascends, thus leaving the packed hay properly baled. The next lot of packed hay, when moved by the plunger, throws the knotted portions of the wire from the knotting tongues of the knotters.

The plates 337, there only being one clearly shown, assist in removing the knotted portions of the wires from the knotting tongues. The wires are brought through the openings 338 of the plates 337 by the threaders, and there is a portion of wire, after the machine has been once started, always remaining in the opening 338. The part of the wire remaining in the opening 338, after the wires beyond the knot have been severed, is somewhat taut, and as the second bale is being forced into the forward portion of the press, this taut wire contacts with the edge 339 of the opening 338 and causes the edge 340 to push the knotted portions of the wire from the knotting tongue. The plate 341 which is pivoted at 342 to the plate 337, and the link 343 pivoted at 344 constitutes means for steadying the movement of the plate 337. The plates 337 are moved against the action of the springs 345, so that they may be permitted to return to their normal positions. The plates 337 are provided with slots 346, through which the bolts 347 extend. These bolts 347 are carried by the plates 348, there being nuts 349 thereon, for holding the plates 337 in position. The plates 348, there being only one shown, reference being had to Figs. 5 and 12, are secured to the frames 163 of the knotters by the bolts 186 and 350, shown clearly in Figs. 6 and 7, so as to hold the plates 348 rigidly in position.

From the foregoing it will be noted that there has been produced an efficient hay press or baling apparatus of great capacity and durability and one which has been found to be a practicable material and labor saving apparatus.

The invention having been set forth, what is claimed as new and useful is:—

1. In a hay baling machine having a bale chamber; a feeding means and a compressing means for the hay; a driving mechanism for actuating the feeding means and the compressing means; a clutch mechanism, including means for operating the same; combined mechanisms, including a revoluble member, thrown in gear with the driving mechanism, by the clutch mechanism, for drawing wires through the bale chamber and binding the wires; a gravitating divider to enter the bale chamber; and means having connections with the revoluble member to raise the divider.

2. In a hay baling machine, a frame having a bale chamber and provided with a hopper, a feeding means and a compressing means for the hay, a mechanism for simultaneously actuating the feeding means and the compressing means, a clutch mechanism including means for operating the same, and means thrown in gear with the first mechanism by the clutch mechanism for drawing wires through the bale chamber and binding the wires, and means including a member in the path of the compressing means and actuated thereby for throwing the clutch in gear.

3. In a hay baling machine having a bale chamber; a feeding means and a compressing means for the hay; a driving mechanism for actuating the feeding means and the compressing means; a clutch mechanism, including means for operating the same; combined mechanisms, including a revoluble member, thrown in gear with the driving mechanism, by the clutch mechanism, for drawing wires through the bale chamber and binding the wires; a gravitating divider to enter the bale chamber; and means having connections with the revoluble member to raise the divider; the divider raising means having devices for cushioning the divider when it gravitates.

4. In a machine as set forth, a vertical movable divider, means for retarding or cushioning the divider, and means coöperating with the first means for raising the divider.

5. In a machine as set forth, a vertical movable gravitating divider, and means for raising the divider, and means for cushioning the divider when lowering to prevent a thud.

6. In a machine as set forth, a gravitating divider, and means having positive connections with the divider for cushioning the same, at the end of its complete movement.

7. In a machine as set forth, a gravity actuated divider, means having positive connections with the divider for cushioning the same, at the end of its complete movement, and means operating the first means for returning the divider.

8. In a machine as set forth, a gravity actuated divider, and an oscillatory member having spring tensioning means and provided with positive connections with the divider for cushioning the same at the end of its complete movement.

9. In a machine as set forth, a gravity actuated divider, and an oscillatory member having spring tensioning means and provided with positive connections with the divider for cushioning the same at the end of its complete movement, and means operating the oscillatory member for resetting the divider.

10. In a machine as set forth, a gravity actuated divider, means for retarding the divider, and a revoluble shaft including a crank handle to actuate said means for raising the divider.

11. In a machine as set forth, a gravitating divider, an oscillatory spring tensioned member for retarding the divider, and a revoluble shaft having a crank handle to engage the member for raising the divider.

12. In a machine as set forth, a gravitating divider, an oscillatory spring tensioned member for retarding the divider, and a revoluble shaft having a crank handle to engage the member for raising the divider, and means for actuating the revoluble shaft.

13. In a machine as set forth, a frame having a bale chamber, a plunger therein including means for actuating the same, a bale wire threading mechanism, a wire twisting mechanism, a divider movable in the chamber, a shaft adapted to be actuated to operate the bale wire threading mechanism, the wire twisting mechanism and the divider, means adapted to be actuated to throw the plunger operating means in gear with the shaft, and means including a device in the path of the plunger for actuating the means between the shaft and the plunger operating means.

14. In a machine as set forth, having a bale chamber, a bale wire threading mechanism, a wire twisting mechanism, a gravity actuated divider including means for raising the divider, and a movable plunger including means for operating the same for throwing the bale wire threading mechanism and wire twisting mechanism into play and releasing the gravity actuated divider in sequence.

15. In a machine as set forth, having a bale chamber, a bale wire threading mechanism, a wire twisting mechanism, a gravity actuated divider including means for raising the divider, and a movable plunger including means for operating the same for throwing the bale wire threading mechanism and the wire twisting mechanism into play and releasing the gravity actuated divider consecutively, and a feeding mechanism actuated simultaneously with the plunger.

16. In a hay baling machine, a knotter adapted to be threaded by a wire threading mechanism, a pair of intermittently revoluble members adapted to receive a twisted end of the wire, the wire adapted to be again caught by said members, means for rotating the members instantly subsequently to catching the wire the second time.

17. In a hay baler, a knotter adapted to be threaded by a wire threading mechanism, a pair of intermittently revoluble members adapted to receive a twisted end of the wire, the wire adapted to be again caught by said members, means for rotating the members instantly subsequently to catching the wire the second time, and means for twisting the two parts of the wire together instantly after the members have been rotated.

18. In a hay baler, a knotter adapted to be threaded by a wire threading mechanism, a pair of intermittently revoluble members adapted to receive a twisted end of the wire, the wire adapted to be again caught by said members, means for rotating the members instantly subsequently to catching the wire the second time, and means for twisting the two parts of the wire together instantly after the members have been rotated, and a revoluble shaft including a device, which first actuates the first means and then the second means.

19. In a hay baler, a knotter adapted to be threaded by a wire threading mechanism, the knotter including a pair of duplicate intermittent revoluble plates adapted to receive a crooked end of the wire, the wire adapted to be again caught in said plates, means for rotating the plates instantly subsequently to their catching the wire the second time, a guide for holding the two parts of the wire in engagement with the plates while being partially moved, and means for twisting two parts of the wire together instantly after the plates have been rotated.

20. In a hay baler, a knotter adapted to be threaded by a wire threading mechanism, the knotter including a pair of duplicate intermittent revoluble plates adapted to receive a crooked end of the wire, the wire adapted to be again caught in said plates, means for rotating the plates instantly subsequently to their catching the wire the second time, a guide for holding the two parts of the wire in engagement with the plates while being partially moved, and means for twisting two parts of the wire together instantly after the plates have been rotated, and a revoluble shaft including a device thereon, which first actuates the first means and then the second means.

21. In a hay baler, a knotter adapted to be threaded by a wire threading mechanism, the knotter including a pair of duplicate intermittent revoluble plates adapted to receive a crooked end of the wire, the wire adapted to be again caught in said plates, means for rotating the plates instantly subsequently to their catching the wire the second time, and means for removing the twisted wire from the twisting means.

22. In a hay baler, a knotter adapted to be threaded by a wire threading mechanism, the knotter including a pair of duplicate intermittent revoluble plates adapted to receive a crooked end of the wire, the wire adapted to be again caught in said plates, means for rotating the plates instantly subsequently to their catching the wire the second time, and means for removing the twisted wire from the twisting means, and a guide for holding the two parts of the wire in engagement with the plates while being partially moved.

23. In a hay baler, a knotter adapted to b threaded by a wire threading mechanism, the knotter including a pair of duplicate intermittent revoluble plates adapted to receive a crooked end of the wire, the wire adapted to be again caught in said plates, means for rotating the plates instantly subsequently to their catching the wire the second time, and means for removing the twisted wire from the twisting means, and a guide for holding the two parts of the wire in engagement with the plates while being partially moved, and means for twisting the two parts of the wire together instantly after the plates have been rotated.

24. In a hay baler, a knotter adapted to be threaded by a wire threading mechanism, the knotter including a pair of duplicate intermittent revoluble plates adapted to receive a crooked end of the wire, the wire adapted to be again caught in said plates, means for rotating the plates instantly subsequently to their catching the wire the second time, and means for removing the twisted wire from the twisting means, and a guide for holding the two parts of the wire in engagement with the plates while being partially moved, and means for twisting the two parts of the wire together instantly after the plates have been rotated, and a revoluble device for first actuating the first means and then the twisting means.

25. In a hay baler, a knotter adapted to be threaded by a wire threading mechanism, the knotter including a pair of duplicate intermittent revoluble plates adapted to receive a crooked end of the wire, the wire adapted to be again caught in said plates, and means for holding the plates separated, means for rotating the plates instantly subsequently to their catching the wire the second time.

26. In a hay baler, a knotter adapted to be threaded by a wire threading mechanism, the knotter including a pair of duplicate intermittent revoluble plates adapted to receive a crooked end of the wire, the wire adapted to be again caught in said plates, and means for holding the plates separated, means for rotating the plates instantly subsequently to their catching the wire the second time, and means for removing the twisted wire from the twisting means.

27. In a hay baler, a knotter adapted to be threaded by a wire threading mechanism, the knotter including a pair of duplicate intermittent revoluble plates adapted to receive a crooked end of the wire, the wire adapted to be again caught in said plates, and means for holding the plates separated, means for rotating the plates instantly subsequently to their catching the wire the second time, and means for removing the twisted wire from the twisting means, and a revoluble device adapted to first actuate the second means and then the third means.

28. In a hay baler, a knotter adapted to be threaded by a wire threading mechanism, the knotter including a pair of duplicate correspondingly intermittent plates adapted to receive a crooked end of the wire, the wire adapted to be again caught in said plates, a spring tensioned guide for holding the two parts of the wire in engagement with the plates while being partially moved, and means for rotating the plates instantly subsequently to their catching the wire the second time.

29. In a hay baler, a knotter adapted to be threaded by a wire threading mechanism, the knotter including a pair of duplicate correspondingly intermittent plates adapted to receive a crooked end of the wire, the wire adapted to be again caught in said plates, a spring tensioned guide for holding the two parts of the wire in engagement with the plates while being partially moved, and means for rotating the plates instantly subsequently to their catching the wire the second time, and means for twisting the two parts of the wire together instantly after the plates have been rotated.

30. In a hay baler, a knotter adapted to be threaded by a wire threading mechanism, the knotter including a pair of duplicate correspondingly intermittent plates adapted to receive a crooked end of the wire, the wire adapted to be again caught in said plates, a spring tensioned guide for holding the two parts of the wire in engagement with the plates while being partially moved, and means for rotating the plates instantly subsequently to their catching the wire the second time, and means for twisting the two parts of the wire together instantly after the plates have been rotated, and a revoluble device for first actuating the first means and then the twisting means.

31. In a hay baler, a knotter adapted to be threaded by a wire threading mechanism, the knotter, including a pair of duplicate intermittent correspondingly revoluble plates having edge recesses to receive a crooked end of the wire, the wire adapted to be again caught in said plates, a revoluble device having a tapering distorted end for twisting the two parts of the wire, and a revoluble shaft including a device thereon which is adapted to operate the revoluble device, and a mechanism actuated by the device on the shaft for rotating the plates.

32. In a hay baler, a knotter adapted to be threaded by a wire threading mechanism, the knotter including a pair of duplicate intermittent correspondingly revoluble plates having edge recesses to receive a crooked end of the wire, the wire adapted to be again caught in said plates, a spring tensioned guide for holding the wire in the edge recesses, a revoluble device having a tapering distorted end for twisting the two parts of the wire, and a revoluble shaft including a device thereon which is adapted to operate the revoluble device, and a mechanism actuated by the device on the shaft for rotating the plates.

33. In a hay baler, a knotter adapted to be threaded by a wire threading mechanism, the knotter including a pair of duplicate intermittent correspondingly revoluble plates having edge recesses to receive a crooked end of the wire, the wire adapted to be again caught in said plates, a spring tensioned guide for holding the wire in edge recesses, a revoluble device having a tapering distorted end for twisting the two parts of the wire, and a revoluble shaft including a device thereon which is adapted to operate the revoluble device, and a mechanism actuated by the device on the shaft for rotating the plates, and means for removing the twisted wire from the distorted end.

34. In a hay baler, a knotter adapted to be threaded by a wire threading mechanism, the knotter including a pair of duplicate intermittent correspondingly revoluble plates having edge recesses to receive a crooked end of the wire, the wire adapted to be again caught in said plates, a spring tensioned guide for holding the wire in the edge recesses, a revoluble device having a tapering distorted end for twisting the two parts of the wire, and a revoluble shaft including a device thereon which is adapted to operate the revoluble device, and a mechanism actuated by the device on the shaft for rotating the plates, and means for removing the twisted wire from the distorted end, and means placed under tension as the revoluble device twists the wire, and said means that is placed under tension constituting means for holding the revoluble device in its normal position after twisting the wire.

35. In a baling press having a baling chamber, a plunger operable therein, means for operating the plunger, a divider operable in the bale chamber, a knotting mechanism, a wire threading mechanism therefor, and a mechanism having clutch connections with the means and provided with a device in the path of the plunger for throwing the clutch connections for coördinately operating the divider, the knotting mechanism and the wire threading mechanism.

36. In a baling press having a baling chamber, a plunger operable therein, means for operating the plunger, a divider operable in the bale chamber, a knotting mechanism, a wire threading mechanism therefor, and a mechanism having a clutch connection with the means and provided with a device in the path of the plunger for throwing the clutch connections for coördinately operating the divider, the knotting mechanism and the wire threading mechanism, means for holding the device in the position as actuated by the plunger, and a bale operated mechanism for actuating the second means to release the device so it may assume a position in the path of the plunger.

37. In a baling press having a baling chamber, a plunger operable therein, means for operating the plunger, a divider operable in the bale chamber, a knotting mechanism, a wire threading mechanism therefor, the divider, the knotting mechanism, and the wire threading mechanism having inter-operable connections, and a mechanism having clutch connections with the means and including a device in the path of the plunger for throwing the clutch connections for coördinately operating the divider, the knotting mechanism and the wire threading mechanism.

38. In a baling press having a baling chamber, a plunger operable therein, means for operating the plunger, a divider operable in the bale chamber, a knotting mechanism, a wire threading mechanism therefor, a mechanism having automatic releasable clutch connections with the means for coördinately operating the divider, the knotting mechanism and the wire threading mechanism, and a device in the path of the plunger for throwing the clutch connection.

39. In a baling press having a baling chamber, a plunger operable therein, means for operating the plunger, a divider operable in the bale chamber, a knotting mechanism, a wire threading mechanism therefor, a mechanism having automatically releasable clutch connections with the means for coördinately operating the divider, the knotting mechanism and the wire threading mechanism, and a device in the path of the plunger for throwing the clutch connection, means for holding the device in the position as actuated by the plunger, and a bale operated mechanism for actuating the holding means to release the device so it may assume its position in the path of the plunger.

40. In a baling press having a baling chamber, a plunger operable therein, means for operating the plunger, a divider operable in the bale chamber, a knotting mechanism, a wire threading mechanism therefor, the divider, the knotting mechanism and the wire threading mechanism having inter-operable connections, and a mechanism having clutch connections with the means and including a device in the path of the plunger for throwing the clutch connections and holding them thrown for a predetermined period for coördinately operating the divider, the knotting mechanism and the wire threading mechanism, the clutch connections being automatically releasable from the device at the predetermined period.

41. In a baling press having a baling chamber, a plunger operable therein, means for operating the plunger, a divider operable in the bale chamber, a knotting mechanism, a wire threading mechanism therefor, the divider, the knotting mechanism and the wire threading mechanism having interoperable connections, and a mechanism having clutch connections with the means and including a device in the path of the plunger for throwing the clutch connections and holding them thrown for a predetermined period for coördinately operating the driver, the knotting mechanism and the wire threading mechanism, the clutch connections being automatically releasable from the device at the predetermined period, means for holding the device in the position as actuated by the plunger, and a bale operated mechanism for actuating the holding means to release the device so it may assume its position in the path of the plunger.

42. In a baling press, a knotting mechanism, a wire threading mechanism therefor having a needle provided with a tip, and a cam strap with which the end of the tip contacts to be deflected, whereby the knotter is threaded.

43. In a baling press, a knotting mechanism, a wire threading mechanism therefor having a needle provided with a tip, and a cam strap with which the end of the tip contacts to be deflected, whereby the knotter is threaded, and means for actuating the needle.

44. In a baling press, a knotting mechanism, a wire threading mechanism therefor having a needle provided with a tip, and a cam strap with which the end of the tip contacts to be deflected, whereby the knotter is threaded, and means for positively holding the tip in position prior to being deflected.

45. In a baling press having a knotting mechanism including a curved cam strap, a wire needle threader movable transversely of the press and provided with a needle tip adapted to be deflected downwardly by the cam strap, means for positively holding the tips in position prior to being deflected, means for releasing the holding means while the needle is moving to permit the needle tip to be deflected.

46. In a baling press having a knotting mechanism including a curved cam strap, a wire needle threader movable transversely of the press and provided with a needle tip adapted to be deflected downwardly by the cam strap, means for positively holding the tips in position prior to being deflected, means for releasing the holding means while the needle is moving to permit the needle tip to be deflected, and means put under tension by the deflection of the needle tip for restoring the needle tip to its normal position on the reverse transverse movement of the needle.

47. In a hay baling machine having a bale chamber and provided with a hopper, a feeding means and a compressing means for the hay, a mechanism for simultaneously actuating the feeding means and the compressing means, a clutch mechanism, means including a shaft and adapted to be thrown in gear with the first mechanism through the medium of the clutch mechanism for drawing wires through the bale chamber and binding the wires, a divider to enter the chamber, means for normally supporting the same out of the chamber, the means adapted to be automatically actuated by the shaft for releasing the divider.

48. In a hay baling machine having a bale chamber and provided with a hopper, a feeding means and a compressing means for the hay, a mechanism for simultaneously actuating the feeding means and the compressing means, a clutch mechanism means including a shaft and adapted to be thrown in gear with the first mechanism through the medium of the clutch mechanism for drawing wires through the bale chamber and binding the wires, a divider to enter the chamber, means for normally supporting the same out of the chamber, the means adapted to be automatically actuated by the shaft for releasing the divider, the means for normally supporting the divider including the cushioning means for the divider.

49. In a hay baling machine having a knotting mechanism which includes an operating shaft, a divider, a fulcrumed member connected to the divider, means normally engaging the fulcrumed member to support the divider, and connections between the means and the operating shaft to operate the means to intermittently release the member.

50. In a hay baling machine having a knotting mechanism which includes an operating shaft, a divider, a fulcrumed member connected to the divider, means normally engaging the fulcrumed member to support the divider, and connections between the means and the operating shaft to operate the means to intermittently release the member, and cushioning means connecting between the member and the frame of the machine for cushioning the divider.

51. In a hay baling machine having a baling chamber and provided with a knotting mechanism, which includes an operating shaft, a gravitating divider, a fulcrumed member connected to the divider, means normally engaging the fulcrumed member to support the divider, and connections between the means and the operating shaft to operate the means to intermittently release and reset the member.

52. In a hay baling machine having a baling chamber and provided with a knotting mechanism, which includes an operating shaft, a gravitating divider, a fulcrumed member connected to the divider, means normally engaging the fulcrumed member to support the divider, and connections between the means and the operating shaft to operate the means to intermittently release and reset the member, and cushioning means connecting between the member and the frame of the machine for cushioning the divider.

53. In a hay baling machine having a bale chamber and provided with a hopper, a feeding means and a compressing means for the hay, a mechanism for simultaneously actuating the feeding means and the compressing means, a clutch mechanism means including a shaft and adapted to be thrown in gear with the first mechanism through the medium of the clutch mechanism for drawing wires through the bale chamber and binding the wires, a gravitating divider to enter the bale chamber, means for normally supporting the same out of the bale chamber, the means adapted to be automatically actuated by the shaft for automatically releasing and resetting the same, thereby in turn resetting the divider.

54. In a hay baling machine having a bale chamber and provided with a hopper, a feeding means and a compressing means for the hay, a mechanism for simultaneously actuating the feeding means and the compressing means, a clutch mechanism means including a shaft and adapted to be thrown in gear with the first mechanism through the medium of the clutch mechanism for drawing wires through the bale chamber and binding the wires, a gravitating divider to enter the bale chamber, means for normally supporting the same out of the bale chamber, the means adapted to be automatically actuated by the shaft for automatically releasing and resetting the same, thereby in turn resetting the divider, the means for normally supporting the divider including cushioning means for the divider.

55. In a hay baling machine having a bale chamber and provided with a hopper, a feeding means and a compressing means for the hay, a mechanism for simultaneously actuating the feeding means and the compressing means, a clutch mechanism means including a shaft and adapted to be thrown in gear with the first mechanism through the medium of the clutch mechanism for drawing wires through the bale chamber and binding the wires, a gravitating divider to enter the bale chamber, a fulcrumed member connected to the divider, a device adapted to normally engage the member to support the divider out of the bale chamber, the device having connections with the shaft, whereby the device is automatically and intermittently actuated for intermittently releasing and resetting the member, thereby releasing and resetting the divider.

56. In a hay baling machine having a bale chamber and provided with a hopper, a feeding means and a compressing means for the hay, a mechanism for simultaneously actuating the feeding means and the compressing means, a clutch mechanism means including a shaft and adapted to be thrown in gear with the first mechanism through the medium of the clutch mechanism for drawing wires through the bale chamber and binding the wires, a gravitating divider to enter the bale chamber, a fulcrumed member connected to the divider, a device adapted to normally engage the member to support the divider out of the bale chamber, the device having connections with the shaft, whereby the device is automatically and intermittently actuated for intermittently releasing and resetting the member, thereby releasing and resetting the divider, and means connecting between the fulcrumed member and the frame of the machine for cushioning the divider.

57. In a hay baling machine having a baling chamber, a plunger operable therein, means for operating the plunger, a gravitating divider operable in the bale chamber, a mechanism for operating the divider, cushioning means for the divider, a knotting mechanism, a wire threading mechanism therefor, a mechanism having automatic releasable clutch connections with the first means for coördinately operating the divider operating mechanism, the knotting mechanism and the wire threading mechanism.

58. In a hay baling machine having a baling chamber, a plunger operable therein, means for operating the plunger, a gravitating divider operable in the bale chamber, a mechanism for operating the divider, cushioning means for the divider, a knotting mechanism, a wire threading mechanism therefor, a mechanism having automatic releasable clutch connections with the first means for coördinately operating the divider operating mechanism, the knotting mechanism and the wire threading mechanism, and a device in the path of the plunger for throwing the clutch connections.

59. In a hay baling machine having a baling chamber, a plunger operable therein, means for operating the plunger, a gravitating divider operable in the bale chamber, a mechanism for operating the divider, cushioning means for the divider, a knotting mechanism, a wire threading mechanism therefor, a mechanism having automatic releasable clutch connections with the first means for coördinately operating the divider operating mechanism, the knotting mechanism and the wire threading mechanism, and a device in the path of the plunger for throwing the clutch connections, means for holding the device in the position as actuated by the plunger, and a bale operated mechanism for actuating the holding means to release the device so it may assume its position in the path of the plunger.

60. In a baling press having a baling chamber, a plunger operable therein, a gravitating divider operable in the bale chamber, cushioning means for the divider, means for operating the plunger, a knotting means, a wire threading means therefor, a mechanism having automatic releasable clutch connections with the operating means of the plunger for coördinately operating the knotting means and the wire threading means, and a device coöperating with the cushioning means and provided with connections with the mechanism for automatically releasing and resetting the cushioning means intermittently to actuate the divider intermittently.

61. In a baling press having a baling chamber, a plunger operable therein, a gravitating divider operable in the bale chamber, cushioning means for the divider, means for operating the plunger, a knotting means, a wire threading means therefor, a mechanism having automatic releasable clutch connections with the operating means of the plunger for coördinately operating the knotting means and the wire threading means, and a device coöperating with the cushioning means and provided with connections with the mechanism for automatically releasing and resetting the cushioning means intermittently to actuate the divider intermittently, and an element in the path of the plunger for throwing the clutch connections.

62. In a baling press having a baling chamber, a plunger operable therein, a gravitating divider operable in the bale chamber, cushioning means for the divider, means for operating the plunger, a knotting means, a wire threading means therefor, a mechanism having automatic releasable clutch connections with the operating means of the plunger for coördinately operating the knotting means and the wire threading means, and a device coöperating with the cushioning means and provided with connections with the mechanism for automatically releasing and resetting the cushioning means intermittently to actuate the divider intermittently, and an element in the path of the plunger for throwing the clutch connections, means for holding the element in the position as actuated by the plunger, and a bale operated mechanism for actuating the holding means to release the element so it may assume its position in the path of the plunger.

63. In a baling press having a baling chamber, a continuously operating feeding means and a continuously operating compressing means; a knotting mechanism, a wire threading mechanism therefor, a divider mechanism for dividing the bales; clutch connections, and a plurality of coöperating machine elements, one of which is in the path of the plunger of the compressing means and actuated thereby intermittently to throw the clutch connections for intermittently operating the respective mechanism coördinately, while another of said elements is operated by a bale for restoring the first element in the path of the plunger.

64. In a baling press having a baling chamber, a continuously operating feeding means and a continuously operating compressing means; a knotting mechanism, a wire threading mechanism therefor, a divider mechanism for dividing the bales; clutch connections, and a plurality of coöperating machine elements, one of which is in the path of the plunger of the compressing means and actuated thereby intermittently to throw the clutch connections for intermittently operating the respective mechanism coördinately, while another of said elements is operated by a bale for restoring the first element in the path of the plunger, and connections between the plurality of machine element and the cushioning means for automatically and intermittently releasing and resetting the divider.

65. In a machine as set forth, a gravity actuated divider, and an oscillatory member having spring tensioning means and provided with positive connections with the divider for cushioning the same at the end of its complete movement, and a revoluble shaft including a crank handle to actuate said oscillatory member for resetting the divider.

66. In a hay baling machine, having a baling chamber; a divider, adapted by force of gravity, to enter the chamber in a lateral plane; and means for returning the divider in the same plane.

67. In a baling press, a gravitating divider, means for retarding and cushioning the gravitating divider, and means coöperating with the first means for permitting the divider to gravitate, the last means adapted to operate the retarding cushioning means to reset the divider.

68. In a hay baling machine having a baling chamber; a divider, adapted by force of gravity, to enter the chamber in a lateral plane; means having spring tensioned means connected to the divider to cushion the same at the end of the complete movement, and means for actuating the first means for returning the divider in the same plane to its initial position.

69. In a baling press, a gravitating divider, a spring-tensioned member for cushioning and retarding the divider, and means coöperating with the member to release the divider, the means adapted to actuate the member to reset the divider.

70. In a baling press, a gravitating divider, means for retarding and cushioning the divider, and a revoluble member including a device to permit the said means to actuate to release the divider.

71. In a baling press, a gravitating divider, means for retarding and cushioning the divider, and a revoluble member including a device to permit the said means to actuate to release the divider, the revoluble member adapted to actuate said means to reset the divider.

72. In a baling press, a gravitating divider, a spring-tensioned member for retarding and cushioning the divider, and a revoluble member including a device which releases the spring-tensioned member when the revoluble member is actuated to permit the divider to gravitate.

73. In a baling press, a gravitating divider, a spring-tensioned member for retarding and cushioning the divider, and a revoluble member including a device which releases the spring-tensioned member when the revoluble member is actuated to permit the divider to gravitate, the revoluble member adapted to be actuated to cause the device to actuate the spring-tensioned member to reset the divider.

74. In a baling press, a gravitating divider, a spring-tensioned member for retarding and cushioning the divider, a revoluble member including a device which releases the spring-tensioned member when the revoluble member is actuated to permit the divider to gravitate, the revoluble member adapted to be actuated to cause the device to actuate the spring-tensioned member to reset the divider, and means for actuating the revoluble member.

75. In a baling press having a bale chamber; a divider, adapted by force of gravity to enter the chamber in a lateral plane intermittently; an oscillatory member connected to the divider, and having spring means, whereby the divider is cushioned at the end of its complete movement; and a mechanism intermittently actuated to operate the oscillatory member for intermittently returning the divider to its initial position in the same plane.

76. In a baling press having a bale chamber; a divider, adapted by force of gravity to enter the chamber in a lateral plane intermittently; an oscillatory member connected to the divider, and having spring means, whereby the divider is cushioned at the end of its complete movement; and an intermittently actuated revoluble shaft automatically operated, and having a device to actuate said oscillatory member for resetting the divider intermittently.

77. In a baling press, a knotting mechanism, a needle wire threader for the knotter comprising a bar having a needle tip, a cam strap with which the end of the tip contacts to be deflected, whereby the knotter is threaded, a device on the bar under tension to hold the tip against being deflected when penetrating a bale.

78. In a baling press, a knotting mechanism, a needle wire threader for the knotter comprising a bar having a needle tip, a cam member with which the end of the tip contacts to be deflected, whereby the knotter is threaded, a device on the bar under tension to hold the tip against being deflected when penetrating a bale, and an element in the path of the device on the bar to actuate the same against the tensioning means to permit the tip to be deflected.

79. In a baling press, a knotting mechanism, a wire threading mechanism therefor having a needle provided with a tip, and a cam strap with which the end of the tip contacts to be deflected, whereby the knotter is threaded, means for actuating the needle, and means for permitting the tip to be deflected.

80. In a baling press, a knotting mechanism having a pair of revoluble plates with edge means adapted to receive a crooked end of a wire, and a guide lever with tensioning means to hold the wire in the edge means.

81. In a baling press, a knotting mechanism having a pair of revoluble plates with edge means adapted to receive a crooked end of a wire, and a yieldably mounted tongue lever guide operable between the plates to hold the wire in the edge means.

82. In a baling press, a knotting mechanism having a pair of revoluble plates with edge means adapted to receive a crooked end of a wire, and a yieldably mounted tongue lever guide operable between the plates to hold the wire in the edge means, and means for intermittently actuating the plate.

83. In a baling press, a knotting mechanism having a pair of revoluble plates with edge means adapted to receive a crooked end of a wire, and a yieldably mounted tongue lever guide operable between the plates to hold the wire in the edge means, and means for intermittently actuating the plate, and a severing mechanism to cut the wire.

84. In a baling press, a knotting mechanism having a pair of revoluble plates with edge means adapted to receive an end of a wire, a tongue lever guide pivotally mounted and operable between the plates, and a spring-tensioned device to engage the lever guide to cause it to contact with the wire to hold the same in the edge means.

85. In a baling press, a knotting mechanism, a needle wire threader for the knotter comprising a bar having a needle tip, a cam member with which the end of the tip contacts to be deflected, whereby the knotter is threaded, a device on the bar under tension to hold the tip against being deflected when penetrating a bale, and an element in the path of the device on the bar to actuate the same against the tensioning means to permit the tip to be deflected, and means for actuating the needle bar.

In testimony whereof we have signed our names to this specification in the presence of two subscribing witnesses.

FRED SEEHAFER.
WILLIAM PRAHL.

Witnesses:
  JOHN J. DOHL,
  ROBERT A. BOSWELL.